United States Patent [19]

Kato et al.

[11] Patent Number: 5,066,449

[45] Date of Patent: Nov. 19, 1991

[54] INJECTION MOLDING PROCESS FOR CERAMICS

[75] Inventors: Shigeki Kato, Nagoya; Katsuhiro Inoue, Ama, both of Japan

[73] Assignee: NGK Insulators, Ltd., Aichi, Japan

[21] Appl. No.: 454,912

[22] Filed: Dec. 22, 1989

[30] Foreign Application Priority Data

Dec. 23, 1988 [JP] Japan ................................ 63-325574
Dec. 24, 1988 [JP] Japan ................................ 63-326930
Dec. 24, 1988 [JP] Japan ................................ 63-326931

[51] Int. Cl.[5] ......................... B29B 7/00; B29C 45/00
[52] U.S. Cl. .................................... 264/406; 264/327; 264/328.8; 264/328.12; 264/328.16
[58] Field of Search ................. 264/40.6, 328.2, 328.8, 264/328.12, 328.16, 328.4; 425/547, 567, 568

[56] References Cited

U.S. PATENT DOCUMENTS 4,627,809 12/1986 Okabayashi et al. ............... 425/555

OTHER PUBLICATIONS

Matsuddy, B. C. "Equipment Selection for Injection Molding", *Ceramic Bulletin* vol. 68, No. 10 (1989).

*Primary Examiner*—James Lowe
*Assistant Examiner*—Christopher A. Fiorilla
*Attorney, Agent, or Firm*—Parkhurst, Wendel & Rossi

[57] ABSTRACT

In the injection molding process of ceramics, an injection mold having an area of the gate of at least 20% of the maximum cross-sectional area of the cavity viewed from the gate side is employed. The gate preferably has a shape substantially similar to a projection of the cavity viewed from the gate side. Further, the temperature of the mold is preferred to be controlled to have a temperature gradient in such a manner that the distribution of temperature of the molded body in the vicinity of the mold is brought into the range of ±0.5° C. about a setting temperature, at the time pressurization of the molded body in the mold has just been completed. According to the process of the invention, the molding material injected and passed through the gate is controlled to flow smoothly along the shape of the cavity, uniformly purging the air so that homogeneous molded bodies free from defects, such as pores, weld-marks, or the like, can be obtained.

11 Claims, 20 Drawing Sheets

INJECTION MOLDING PROCESS FOR CERAMICS

BACKGROUND OF THE INVENTION

1. Field of the Invention

The present invention relates to an injection molding process for manufacturing injection molded ceramic articles having excellent in quality and properties, and to molds to be used therefor.

2. Description of the Prior Art

Since silicon ceramics, such as silicon nitride, silicon carbide, SIALON, or the like, are more stable and less susceptible to oxidation corrosion or deformation at high temperatures than metals, active research has been conducted recently on utilization of silicon ceramics as engine parts. For example, radial turbine rotors made of these ceramic materials are lighter and superior excellent in thermal efficiency, thus allowing operating temperatures of engines to be raised, as compared with rotors made of metals. Accordingly, silicon ceramics have been drawing attention for use as a turbo charger rotor, gas turbine rotor, etc. for automobiles.

Since such a turbine rotor has intricate three-dimensional shaped blades, naturally it is very difficult to finish such a rotor by grinding sintered solid materials of simple shapes, for example, dense silicon nitride or silicon carbide sintered bodies shaped as a circular cylinder, square cylinder or the like, into a desired shape.

As processes for molding ceramics, the following are well known: a plastic molding process, such as extrusion molding or the like, wherein plasticity of molding materials is utilized; a slip cast molding process wherein a slip, namely, an aqueous suspension of ceramic starting material powder, is poured into a mold; a dry pressure molding process wherein a prepared powder is loaded into a mold and pressed; and the like. Other than the above, injection molding processes that have been extensively employed in molding of plastics have recently begun to be applied in molding ceramics into irregular or intricate shapes as well.

The injection molding processes have been performed mainly for thermoplastic resins in plastic molding, wherein heat-fluidized plastic materials are pressurized by a plunger or the like, pushed into a chilled metal mold and solidified by cooling into an integral, molded body. In such injection molding processes, various improvements have been made through many years of research in the plastics industry.

However, in the ceramics industry, it has heretofore been considered that qualities and properties of final molded products mainly depend upon starting material fine powders. Therefore, it is the present situation that extensive technical developments have been achieved in preparation of starting material fine powders, while research and development of molding processes have fallen behind. Recently, the molding processes have been found to influence largely upon qualities, etc. of molded products, so that the molding processes are now being reviewed. Particularly, recently injection molding processes began to be applied in ceramic molding and, therefore, injection molding machines, metal molds or the like are still at the stage that many improvements are required.

In the injection molding processes of ceramics, since conventional ceramic material fine powders, per se, different from plastics, have no plasticity, there have been employed molding materials, such as pellets, plasticized by admixing a starting material fine powder with a thermoplastic resin, or a molding material (kneaded material or pug) obtained by adding water as a plasticizing medium. Such processes have been proposed by the assignee of the present application in Japanese Patent Application Laid-open No. 64-24,707. Namely, injection molding processes comprise the steps of: mixing a ceramic powder with an organic binder comprising a thermoplastic resin, such as polyethylene, polystyrene or the like, a plasticizer, a dispersant, wax, etc.; plasticizing by heating the mixed material; and injecting the plasticized material into a metal mold. Alternatively, there are also known injection molding processes comprising the steps of: mixing a ceramic power with mainly water as a plasticizing medium and an organic binder as a plasticizer; plasticizing by cooling the resulting mixture; and injecting the plasticized material into a metal mold. The thus obtained molded bodies are heated to burn organic binder and then fired to provide ceramic sintered products. According to the above molding processes, molded bodies such as intricate parts can be obtained rapidly with high accuracy by a single operation at a low cost, which intricate parts would otherwise require considerable time and money to produce.

However, the inclusion of air bubbles or non-homogeneity maybe induced in the molding materials during injection from an injection molding machine to a metal mold, since these molding materials are low in fluidity as compared with thermoplastic resins or cannot be sufficiently fluidized by heating. In particular, with regard to molding materials using mainly water as a plasticizing medium, as shown in the above described Japanese Patent Application Laid-open No. 64-24,707, of which physical properties, etc. have not been elucidated yet, development of conditions, etc. to be applied in injection molding processes has been expected.

Meanwhile, as for the temperature of the metal molds in conventional injection molding processes, it is usually equalized throughout the mold from its gate up to the endmost portion. However, when the temperature of the metal mold is equalized, the molding material differs in temperature between near the gate portion and the endmost portion of the metal mold during injection molding, resulting in cracks, deformation or the like in sintered products obtained by firing molded bodies, thus providing sintered products with low and uneven dimensional accuracy, strength or the like. Therefore, heretofore homogeneous sintered products have not been able to be obtained.

SUMMARY OF THE INVENTION

In view of the above present situation, we, the inventors, conducted assiduous studies on injecting molding materials uniformly into metal molds in injection molding processes and have found it effective to use molds of specified shapes. We further found that the molded body in the mold can be controlled to have a uniform temperature throughout the whole body by providing a temperature gradient to the metal mold, and thus have reached the present invention.

An object of the present invention is to provide homogeneous ceramic molded bodies free from defects such as pores, weld-marks or the like.

Another object of the present invention is to provide homogeneous ceramic sintered products with a high dimensional accuracy and a uniform strength, without causing cracks or deformation.

A further object of the invention is to provide injection molding processes and molds to be used therefor, for obtaining intricately shaped, homogeneous ceramic molded bodies efficiently in a high yield.

The first embodiment of the present invention to attain the above objects is, in injection molding processes of ceramics wherein a molding material (pellets, body or pug) comprising a ceramic powder and an organic binder admixed therewith is injected through a gate into a cavity of a metal mold, an injection mold is used having an area of the gate of at least 20% of the maximum cross-sectional area of the cavity viewed from the gate side.

If the injection mold to be used in the above first embodiment of the invention is provided with a gate opening having a shape substantially similar, namely, similar or approximately similar geometrically, to a projection of the cavity viewed from the gate side, the objects of the present invention can be achieved more effectively.

The second embodiment of the present invention is, in injection molding processes for producing a ceramic molded body comprising a plurality of portions different in thickness, characterized by arranging a gate to open directly into at least one broad portion of the cavity corresponding to the thick portion of the molded body.

In the present invention, it is preferred to control the temperature of the metal mold in such a manner that the distribution of temperature of the molded body in the vicinity of the metal mold is brought into the range of ±0.5° C. about a setting temperature, when pressurization has just been completed. The above temperature control can further improve uniformity of the molded body.

Throughout this specification and the appended claims, by the expression "the maximum cross-sectional area of the cavity viewed from the gate side" (hereinafter may be referred to simply as "the maximum cross-sectional area of the cavity"), we mean the area of the maximum cross-section of the cavity taken perpendicularly to the movement direction of the molding material passing through the gate. Further, by the expression "a projection of the cavity viewed from the gate side" (hereinafter may be referred to simply as "a projection of the cavity"), we mean a projected figure of the cavity on a plane perpendicular to the movement direction of the molding material passing through the gate.

Furthermore, a thick portion and a thin portion of a molded body are herein defined as follows:

Let the diameter of the largest sphere inscribed in the shape of the molded body be defined to be the largest thickness of the molded body. When a diameter of an inscribed sphere in a certain portion of the molded body is at least 40% of the largest thickness, this portion is defined as a thick portion, while if a diameter of an inscribed sphere in a certain portion is less than 40% of the largest thickness, such a portion is defined as a thin portion. A molded body comprising a plurality of thick portions is understood to mean a molded body having at least one thin portion between the above defined thick portions.

BRIEF DESCRIPTION OF THE DRAWINGS

The present invention will be explained in more detail hereinafter by way of example with reference to the appended drawings.

FIGS. 9b and 9c are schematic views of the molded body shown in FIG. 9a;

DESCRIPTION OF THE PREFERRED EMBODIMENTS

In injection molding of ceramics, pellets, kneaded materials or pugs (hereinafter may be referred to as "a molding material") are shaped into molded bodies by being pressurized with a plunger, screw or the like of an injection molding machine and injected into a mold. The injection mold generally comprises a cavity having a shape corresponding to the shape of the molded body and a molding material lead part comprising a sprue, a runner and a gate to lead the molding material from an injection nozzle to the cavity. It is usually preferred to give a slope of about 2°–10° to the sprue and runner walls.

According to the first embodiment of the present invention, an injection mold having a gate area of at least 20%, preferably at least 30%, more preferably at least 40%, most preferably at least 50%, of the maximum cross-sectional area of a cavity viewed from the gate side is used in injection molding processes of ceramics. When the gate area is at least 20% of the maximum cross-sectional area of the cavity, the molding material having passed through the gate flows along the shape of the cavity, so that purging of the air from the cavity is performed smoothly and uniformly, yielding flawless molded bodies. In contrast, if a mold having a gate area of less than 20% of the maximum cross-sectional area of the cavity is used, the molding material having passed through the gate does not flow along the shape of the cavity, so that the purging of the air from the cavity is not performed uniformly, causing defects such as pores, weld-marks or the like and lowering the yield of the obtained molded bodies.

Figure 1:
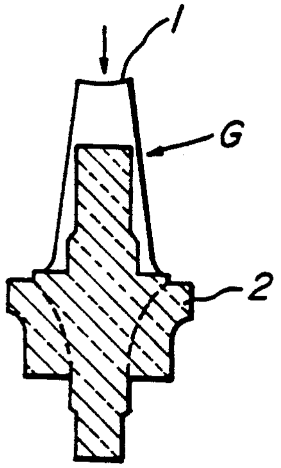
FIG. 1 is a sectional view of a metal mold taken along its center axis, illustrating a direct gate.

In general, by the gate is meant an entrance through which the molding material flows into the cavity (product portion). However, in the case of a direct gate as shown in FIG. 1, for example, the sprue or runner and the cavity (product portion) are not clearly defined, so that there may be the case where the gate cannot be specified. In such a case, it is preferred that the position G near a nozzle 1 of the product portion 2 is regarded as a gate and the cross-sectional area of the portion G is assumed as a gate area.

Figure 2A:
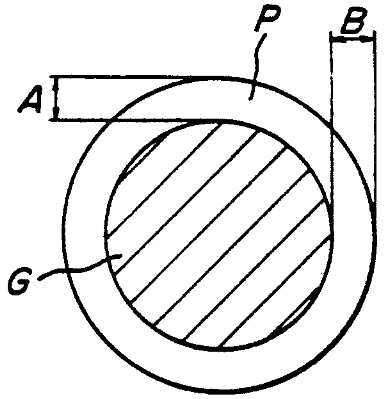
FIGS. 2a–2d illustrate the relation between the shape of a gate and the projection of a cavity, respectively.
Figure 2B:
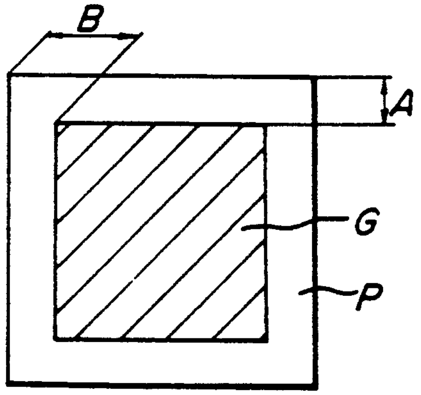
Figure 2C:
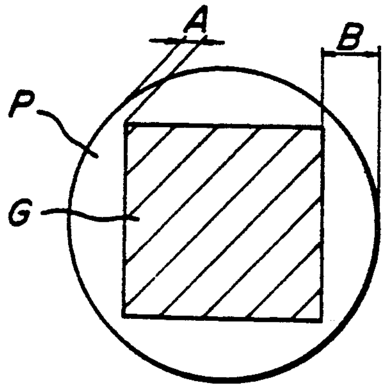
Figure 2D:
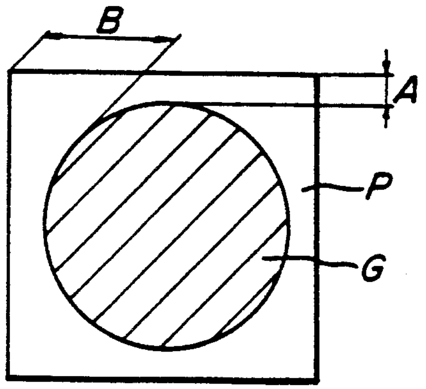

Further, according to the present invention, if the gate G of injection molds is formed in a figure substantially similar, namely, similar or approximately similar, to the projection P of the cavity viewed from the gate side, the molding material having passed through the gate can be controlled to flow along the shape of the cavity, so that formation of defects in the molded bodies can be prevented more effectively. This effect can be augmented particularly by increasing the cross-sectional area of the gate. Additionally, in the above case, it is preferred to arrange the gate to be in the center of the gate-fixing-face of the cavity. This is because, in FIGS. 2*a*–2*d*, letting the minimum and the maximum marginal widths in the non-overlap portion of the cross-sectional shape G of the gate and the projection P of the cavity be A and B, respectively, B/A is smaller (approaches 1) when the shape G and the projection P are substantially similar figures with respect to each other as shown in FIGS. 2*a* and 2*b*, than when G and P are dissimilar as shown in FIGS. 2*c* and 2*d*. Consequently in the former case the molding material flows through the A portion and the B portion substantially at the same rate to fill up the cavity, allowing purging of the air from the cavity to be performed uniformly, thereby yielding flawless molded bodies. In contrast, if the B/A is large like dissimilar figures, the filling-up rate through the A portion is higher than through the B portion, so that the purging of the air from the cavity is irregularly performed, whereby the air is drawn into the molding body, resulting in defects such as pores.

Further, there is shown in Table 1 the relation between, for example, the similar figures shown in FIGS. 2*a* and 2*b* and the dissimilar figures shown in FIGS. 2*c* and 2*d*, where the gate area/the maximum cross-sectional area of the cavity is 50%.

TABLE 1

| | Projection of cavity (molded body) viewed from the gate side | Shape of gate | B/A |
|---|---|---|---|
| 1a | Circular | Circular | 1.0 |
| 1c | Circular | Square | $3.3\left\{\frac{2\sqrt{2}-\sqrt{\pi}}{\sqrt{2}\,(2-\sqrt{\pi})}\right\}$ |
| 1b | Square | Square | $1.4\,(\sqrt{2})$ |
| 1d | Square | Circular | $3.0\left\{\frac{\sqrt{2}\,(\sqrt{\pi}-1)}{\sqrt{\pi}-\sqrt{2}}\right\}$ |

Figure 3A:
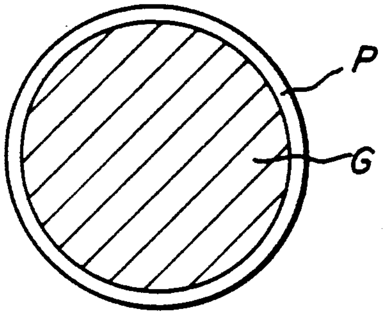
FIGS. 3a and 3b illustrate the relation between the shape of a gate and the projection of a cavity (molded body), when the area ratio of the gate to the maximum cross-section is 90%.
Figure 3B:
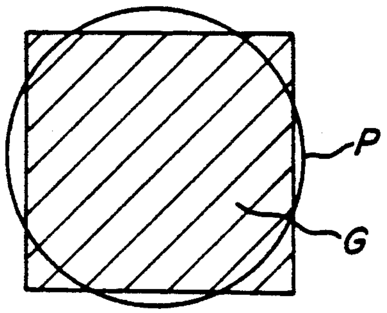

Further, even if the gate area/the maximum cross-sectional area of the cavity (molded body) is the same, for example, 90% in the case shown in FIGS. 3*a* and 3*b*, the similar figures are much better, because in the case of FIG. 3*b*, the shape of the gate protrudes from the cross-sectional shape of the cavity (molded body), which causes inefficiency. Furthermore, the larger the cross-sectional area of the gate, the smaller becomes the B/A value of a gate having a similar figure than the B/A value of a gate having a dissimilar figure. From this fact, it has been found that if a gate of a similar figure, having a large cross-sectional area, is used, the object of the invention can be effectively attained because purging of the air from the cavity is performed more uniformly.

Figure 4A:
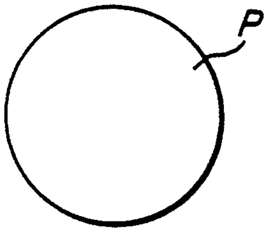
FIGS. 4a–4c, 5a–5c, 6a–6c, 7a–7c and 8a–8c illustrate projections of cavities viewed from the gate side, similar shapes and approximately similar shapes thereto, respectively.
Figure 4B:
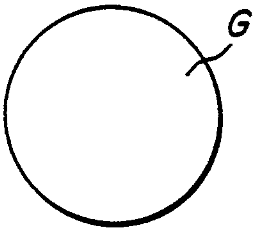
Figure 4C:
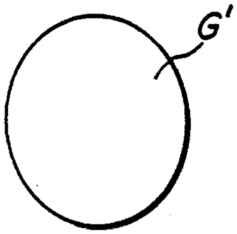
Figure 5A:
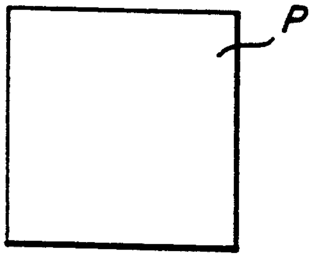
Figure 5B:
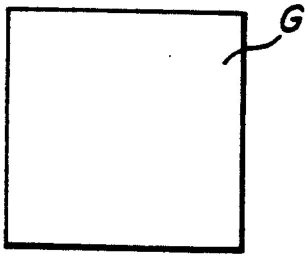
Figure 5C:
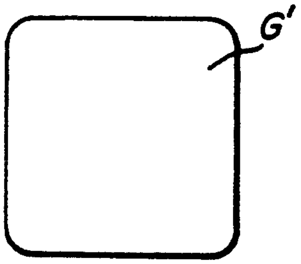
Figure 8A:
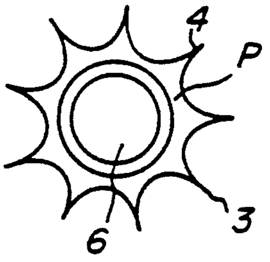
Figure 8B:
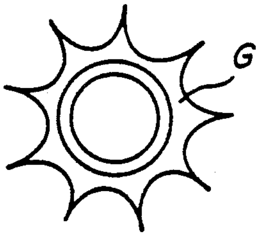
Figure 8C:
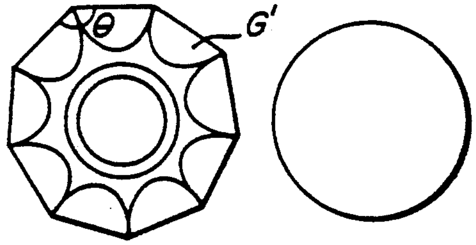

Throughout this specification and appended claims, a substantially similar shape, i.e., a similar shape or approximately similar shape, of the cross-sectional shape of the gate is to be understood to include such shapes as shown in FIGS. 4*a*–8*c*. In FIGS. 4*a*–8*c*, the character P indicates a projection of a cavity viewed from the gate side, and characters G and G' indicate shapes of gate similar and approximately similar thereto, respectively. For example, all of the shapes, P, G and G' shown in FIGS. 4*a*–4*c*, are considered to be circular, while as for squares as shown in FIGS. 5*a*–5*c*, a shape G' is regarded as an approximately similar shape. In the case of polygons, for example, an octagon as shown in FIG. 6*a*, the circular shape G' in FIG. 6*c* can be regarded as an approximately similar shape, because this shape G' can extremely reduce the B/A value. In the case where the projection of the cavity P is a polygon (at least triangle) having any angle ($\theta$) of at least 120°, the approximately similar shape may be circular as G'. Alternatively, in the case of FIGS. 7*a*–7*c* wherein an intricate, asymmetric shape like a stationary blade is shown, for example, an oval like shape G' may be regarded as an approximately similar shape instead of G. Further, in the case of an intricate shape as a turbine rotor shown in FIG. 8*a*, a similar shape G as shown in FIG. 8*b* may be applied, though difficulties are encountered in manufacture of the metal mold or fluidity of molding materials is lowered in the sprue or runner. Therefore, a polygon such as the nonagon G' shown in FIG. 8*c* may be used which is formed by connecting tip ends 3 of the adjacent blades 4 of the shape P. Further, since the angle $\theta$ is 140° in the nonagon, a circular shape as shown in FIG. 8 may take the place.

Figure 9A:
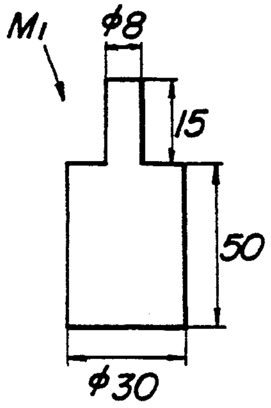
FIG. 9a is a sectional elevation along the center axis of a molded body.
Figure 9B:
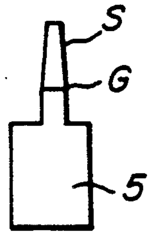
Figure 9C:
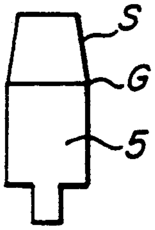

In a mold for producing a ceramic molded body comprising a plurality of portions different in thickness, it is preferred to arrange a gate to open directly into a broad portion of the cavity corresponding to a thick portion of the molded body. For example, when a molded body $M_1$ as shown in FIG. 9*a* is produced by an injection molding process, an arrangement of a sprue S and a gate G as shown in FIG. 9*b* can be designed according to conventional injection molding processes. However, in the mold to be employed in the present invention, as shown in FIG. 9*c*, the injection gate G is provided to open directly into a broad portion 5 of the cavity and the sprue augments gradually its diameter to conform with the cross-sectional shape of the molded body. In such a mold, the molding material is injected from the broad portion into the depth of the cavity.

Figure 6A:
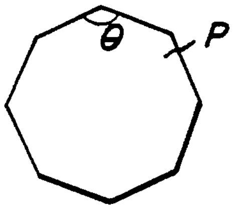
Figure 6B:
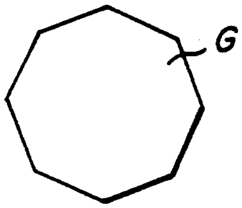
Figure 6C:
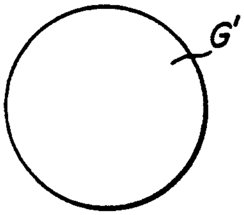
Figure 7A:
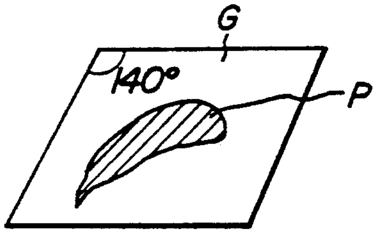
Figure 7B:
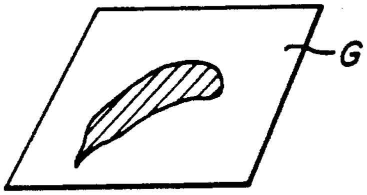
Figure 7C:
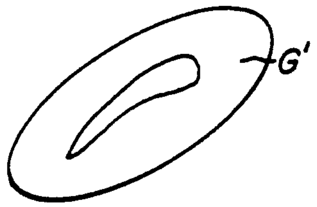

According to the present invention wherein the gate is arranged to open directly into a broad portion of the cavity, the obtained molded bodies are free from defects such as weld-marks or weld lines, drawing-in of air bubbles due to jetting which are seen in conventional processes as shown in "Injection Molding Technology of Fine Ceramics" (Published by Business & Technology, Co.), page 122, FIG. 6.24 and page 123, FIG. 6.27. This is because the molding material is injected massively from the broad portion along the cavity shape without causing jetting and the molding material is scarcely cooled down, maintaining a good fluidity for a long time, so that formation of weld-marks due to lack of fluidity of the molding material can be prevented.

Figure 10A:
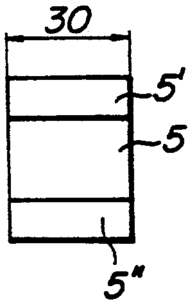
FIGS. 10a and 10b are front and side elevations, respectively, of a molded body.
Figure 10B:
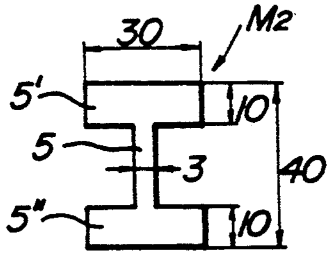
Figure 10C:
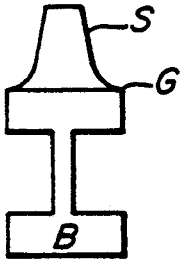
FIGS. 10c–10e are schematic side elevations of metal molds, respectively, for producing the molded body shown in FIGS. 10a and 10b.
Figure 10D:
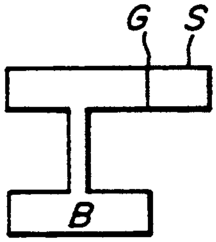
Figure 10E:
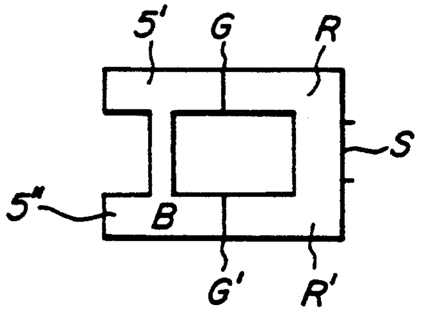

Further, in the case of ceramic molded bodies comprising a plurality of thick portions, for example, a molded body $M_2$ having at least two thick portions 5' and 5" as shown in FIGS. 10*a* and 10*b*, it can be designed either to arrange a sprue S and a gate G as shown in FIGS. 10*c* and 10*d* or to arrange a sprue S, runners R and R' and gates G and G' as shown in FIG. 10*e*. However, in the mold to be applied to the present invention, the injection gates G and G' are provided to open directly into the broad portions 5' and 5", respectively, as shown in FIG. 10*e*, and the molding material is injected from both the injection gates G and G' into respective broad portions 5' and 5" of the cavity. In this case, it is preferred to maximize the amount of the molding material injected into at least any one of broad portions among others. This is because when a plurality of molding materials flowing into the broad portions are joined and welded together in a broad portion, the formation of defects such as pores, weld-marks or the like can be prevented more effectively than when those are joined in a narrow portion. For example, in a mold as shown in FIG. 10*e*, the injection amount into the broad portion 5' can be controlled to become more than the injection amount into the broad portion 5" by making the diameter of the runner R leading to the gate G larger than the diameter of the runner R' leading to the gate G', making the runner R connecting with the sprue S shorter than the runner R', or the like. Needless to say, in the above case, if the molding materials do not join and weld together in a narrow portion, it is not necessary to control even when the runners have the same shape and length.

Moreover, in the molds to be used in the present invention, the lead portion, namely, an injection sprue gate or an injection sprue, runner and a gate, may have a constant taper consecutively from the injection gate to the sprue or the runner. Particularly, in the case of a sprue gate wherein the injection portion comprises a sprue and a gate, those having the above taper are preferred. The taper angle may be selected adequately depending upon molding materials to be employed, and generally about 1°-10°. The taper is provided for expanding the passageway of the molding material gradually to conform with the cavity and allowing the material injected from the nozzle of the injection molding machine to flow smoothly through the gate into the cavity as well as facilitating a smooth release from the mold.

Figure 11:
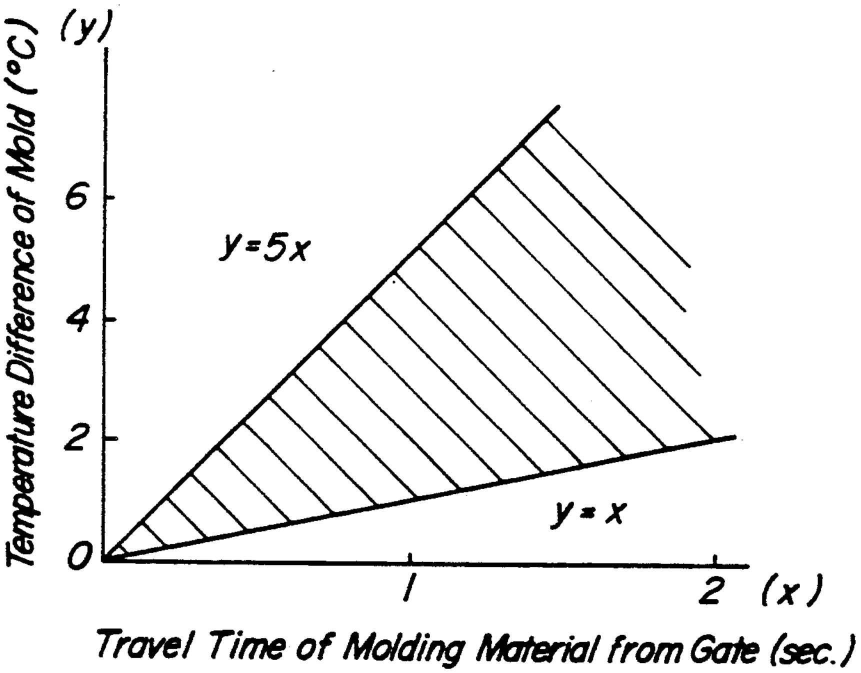
FIG. 11 is a graph showing a temperature gradient of a metal mold used in the present invention.

In the present invention, the temperature of the metal mold is preferred to be controlled in such a manner that the distribution of temperature of the molded body in the vicinity of the metal mold is brought into the range of ±0.5° C. about a setting temperature, at the time pressurization has just been completed. For embodying the above, there is conceivable a method such that, for example, a temperature gradient from the gate portion G through the endmost portion of the metal mold is set, the filling-up rate (injection rate) of the molding material into the metal mold is controlled, or the like. As a concrete example of this embodiment according to the present invention, as shown in FIG. 11, the temperature gradient of the metal mold is set to satisfy the following inequality:

$$x \leq y \leq 5x$$

where, x is a travel time (in second) of molding material from the gate to a temperature measuring position and y is a temperature difference (°C.) of metal mold between the gate and a temperature measuring position. The reason why the range is defined from y=x to y=5x is because:

① specific heat or thermal conductivity of molding material depends upon the kind and amount of organic binders or ceramic powders compounded in the molding materials or the kind and amount of the ceramic powders;

② shape and thickness of the molded bodies are assumed to vary;

③ molding conditions, or the like, are assumed to vary; etc.

Since molding materials having a large specific heat and a low thermal conductivity are hardly influenced by the temperature of the mold, the temperature difference y can be decreased even if the travel time of the molding materials is long, for example, y can be equal to x. Alternatively, since molding materials having a small specific heat and a low thermal conductivity are readily influenced by the temperature of the mold, the temperature difference y must be increased when the travel time of the molding materials is long, for example y may be 5 times x. More concretely, for example, in the case where the ceramic material has a composition comprising 48-60 vol. % of a ceramic powder and 52-40 vol. % of an organic binder consisting of 3-15 wt. % of 10,000–50,000 molecular weight fraction and 85–97 wt. % of 200–1,000 molecular weight fraction, and the molding is conducted at a molding material temperature of 60°–80° C. and a mold temperature of 40°–52° C., the range of y is preferred to be defined by the inequality: $x \leqq y \leqq 5x$.

If the temperature gradient of the metal mold is set as described above, the temperature in the vicinity of the metal mold of the injection molded body will be made substantially uniform throughout the whole body, and have a distribution falling within ±0.5° C. about a setting temperature, so that it is preferred in manufacturing homogeneous molded bodies and subsequent homogeneous sintered products. If the temperature distribution is beyond ±0.5° C. about a setting temperature, the density distribution of the obtained molded bodies becomes broad and uneven and, in consequence, sintered products obtained by firing these molded bodies will be cracked or deformed, resulting in uneven dimensional accuracy and strength or the like, so that uniform sintered products will not be able to be obtained.

Further, the temperature distribution in the vicinity of the metal mold of the molded body is required to be within ±0.5° C. about a setting temperature, when pressurization has just been completed. Generally in injection molding, a molding material is packed into a mold, pressurized at a high pressure for a predetermined time and then maintained under a low pressure for a predetermined time to shape the molded body or to prevent formation of defects such as sink marks or the like. The expression "when the pressurization has just been completed" is understood to mean the time the above pressurizing treatment at a high pressure for a predetermined time has just been completed.

In an injection molding process using organic binders which is prepared by mixing and kneading a starting material compound powder with a large quantity of organic binder comprising a binder, wax, lubricant and the like, since the temperature of the injection molding material is usually higher than the temperature of the metal mold, the molding material is cooled down as it proceeds from the gate to the depth and accordingly the temperature of the molded body also decreases from the gate towards the depth. For maintaining a uniform temperature by compensating the above temperature difference, a preferably temperature condition for metal molds as described hereinabove is to set the temperature of the mold to increase gradually from the gate portion to the endmost portion. The heating means for the metal mold may be usual heaters such as in the form of rod, band or the like, or a liquid such as water or oil.

Alternatively, in an injection molding process using a kneaded material or pug (molding material) which is prepared by admixing a starting material compound powder with a small quantity of an organic binder together with water, since the temperature of the kneaded material or pug is usually lower than the temperature of the metal mold, the temperature of the molding material increases form the gate towards the depth. For maintaining a uniform temperature by compensating the above temperature difference, the temperature of the metal mold is set to decrease gradually from the gate portion to the endmost portion.

As a ceramic powder to be employed in the present invention, mention may be made of hitherto known oxides such as alumina, zirconia or the like, besides, nitrides such as silicon nitride, and carbides such as silicon carbide, which are known as the so-called "new ceramics", composite materials thereof, and the like. As a molding material, there are employable both the injection molding materials (pellets) wherein an organic binder is used as a plasticizer and the injection molding materials (kneaded body or pug) wherein water is used mainly as a plasticizing medium and an organic binder as a plasticizer.

The present invention will be explained in more detail hereinafter by way of example. However, the present invention and the scope of the claims appended hereto are not intended to be limited by these examples.

EXAMPLE 1

Figure 12:
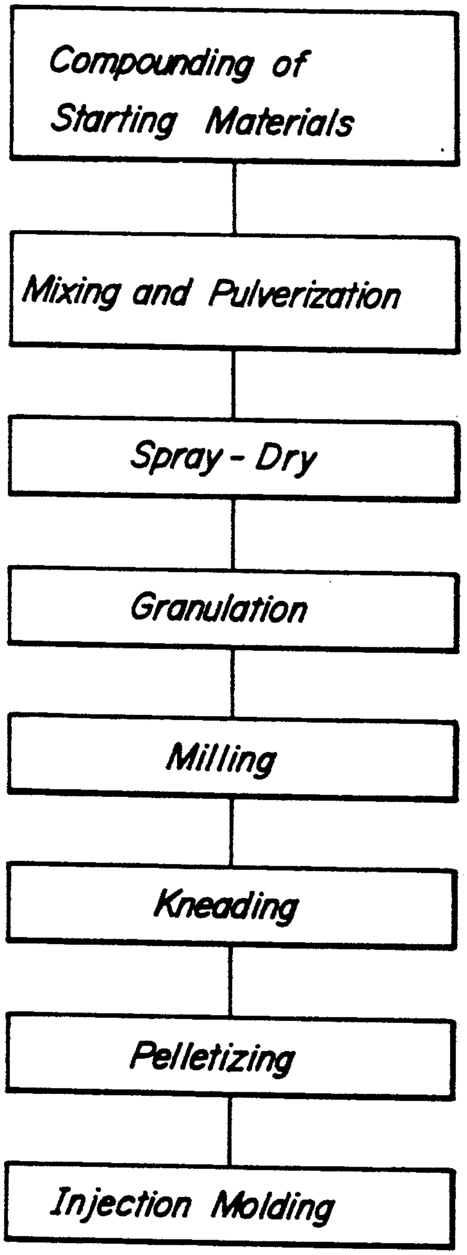
FIG. 12 is a process flow sheet showing steps from preparation of starting material through injection molding of an injection molding material of organic system.

An injection molding process wherein an organic binder was used will be explained according to the process flow chart shown in FIG. 12.

After compounding 100 parts by weight of a ceramic starting material ($Si_3N_4$) powder with 2 parts by weight of SrO, 3 parts by weight of MgO and 3 parts by weight of $CeO_2$ as sintering aids, this mixture was admixed with water and pulverized in wet into an average particle diameter of 0.5 μm in an attritor. Then, the resultant was spray-dried to provide particulates having an average particle diameter of 30 μm which were pressed hydrostaticly at a pressure of 2.5 ton/cm$^2$ and granulated.

Then, the granulated material was milled into an average particle diameter of 30 μm. Then, 100 parts by weight of the obtained powder were admixed and kneaded with 3 parts by weight of a binder (polyethylene/vinyl acetate), 15 parts by weight of a plasticizer (paraffin wax) and 2 parts by weight of a lubricant (stearic acid) and extruded from an extruder and pelletized. The resulting pellets were injection molded by using an injection mold having a shape as shown in Table 2, under conditions of: a material temperature of 68° C., a metal mold temperature of 50° C., an injection pressure of 400 kg/cm$^2$ and an injection speed of 200 cc/sec. Thus, the molded bodies $M_3$, $M_4$ and $M_5$ shown in FIGS. 13–15, respectively, were obtained. As to the molded body $M_5$ shown in FIG. 15, that is a turbine rotor, the cross-sectional area at the maximum diameter portion (φ70 mm) of the hub 6 excluding blades was assumed to be the maximum cross-sectional area.

Figure 16:
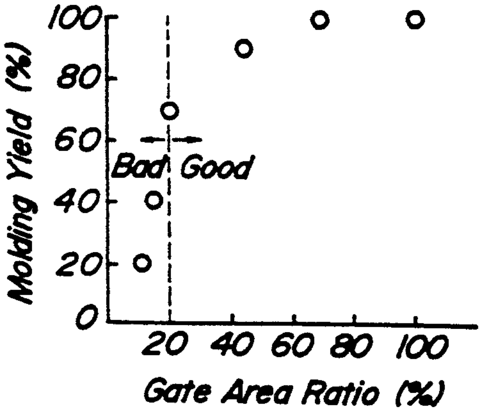
FIGS. 16–18 are graphs showing the relation between percent gate area and molding yield, respectively.
Figure 17:
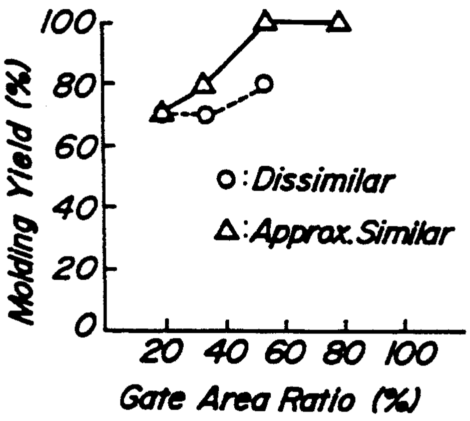
Figure 18:
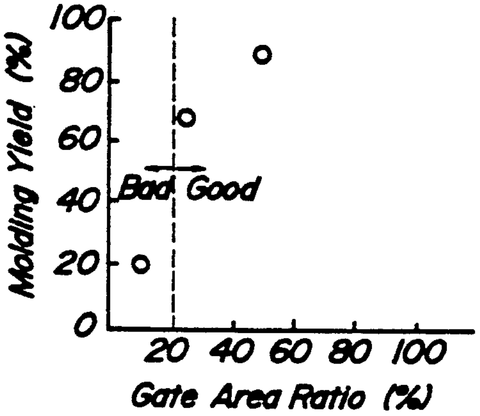

The results are shown in Table 2 and FIGS. 16–18.

TABLE 2

| Test No. | Molded Body | Shape of gate | Area Ratio of Gate to Maximum Cross-section of Cavity (%) | Molding Result |
|---|---|---|---|---|
| 1 | $M_3$ | Circular (Similar Figure) | 11 | 2/10 |
| 2 | $M_3$ | Circular (Similar Figure) | 16 | 4/10 |
| 3 | $M_3$ | Circular (Similar Figure) | 20 | 7/10 |
| 4 | $M_3$ | Circular (Similar Figure) | 44 | 9/10 |
| 5 | $M_3$ | Circular (Similar Figure) | 69 | 10/10 |
| 6 | $M_3$ | Circular (Similar Figure) | 100 | 10/10 |
| 7 | $M_4$ | Circular (Dissimilar Figure) | 20 | 7/10 |
| 8 | $M_4$ | Circular (Dissimilar Figure) | 35 | 7/10 |
| 9 | $M_4$ | Circular (Dissimilar Figure) | 55 | 8/10 |
| 10 | $M_4$ | Oval (Approx. Similar Figure) | 20 | 7/10 |
| 11 | $M_4$ | Oval (Approx. | 35 | 8/10 |

TABLE 2-continued

| Test No. | Molded Body | Shape of gate | Area Ratio of Gate to Maximum Cross-section of Cavity (%) | Molding Result |
|---|---|---|---|---|
| | | Similar Figure) | | |
| 12 | $M_4$ | Oval (Approx. Similar Figure) | 55 | 10/10 |
| 13 | $M_4$ | Oval (Approx. Similar Figure) | 80 | 10/10 |
| 14 | $M_5$ | Circular (Approx. Similar Figure) | 11 | 2/10 |
| 15 | $M_5$ | Circular (Approx. Similar Figure) | 25 | 7/10 |
| 16 | $M_5$ | Circular (Approx. Similar Figure) | 51 | 9/10 |
| 17 | $M_5$ | Circular (Approx. Similar Figure) | 80 | 10/10 |

Note: The result of molding shows a ratio of conforming articles per 10 molded articles.

EXAMPLE 2

Figure 19:
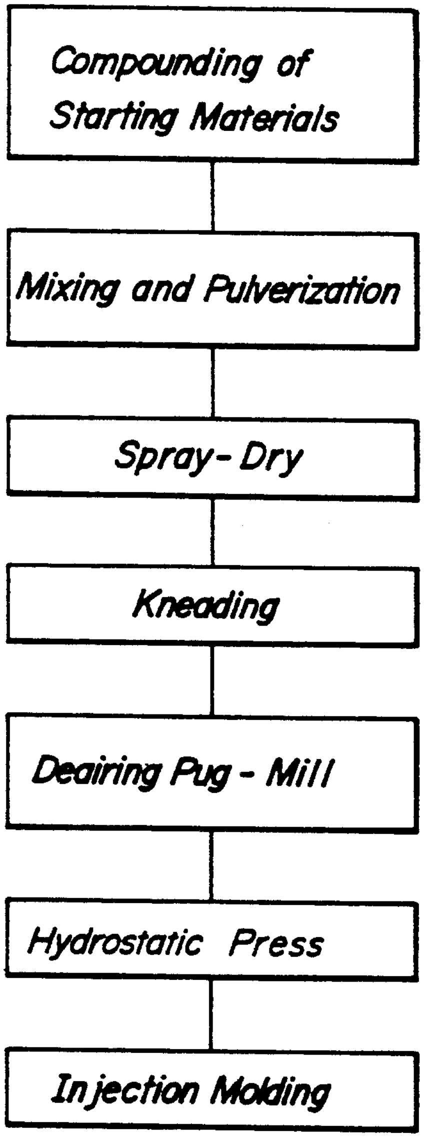
FIG. 19 is a process flow sheet showing steps from preparation of starting material through injection molding of an injection molding material of aqueous system.

An injection molding process wherein kneaded material or pug was used will be explained according to the process flow chart shown in FIG. 19.

Figure 13:
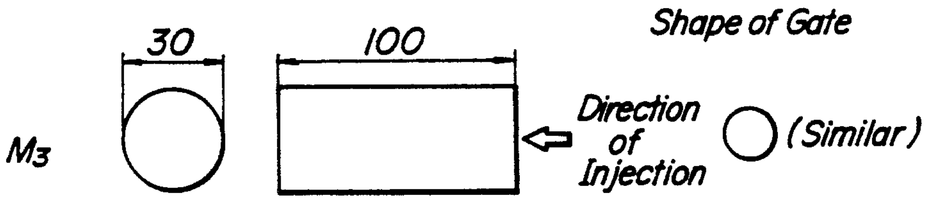
FIGS. 13–15 illustrate the shapes of a molded body and a gate, respectively.
Figure 14:
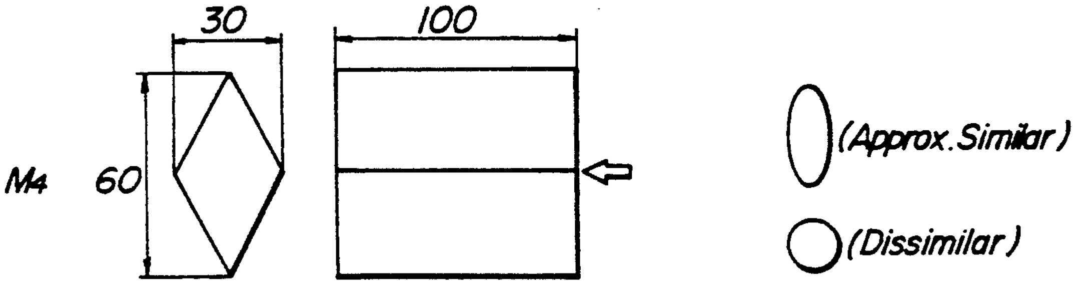
Figure 15:
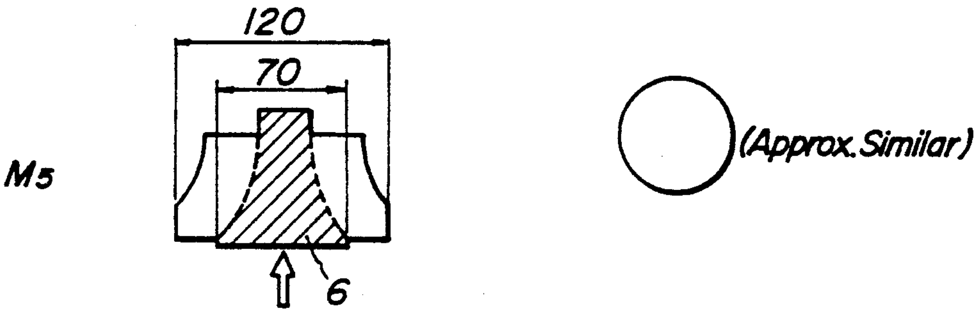
Figure 20:
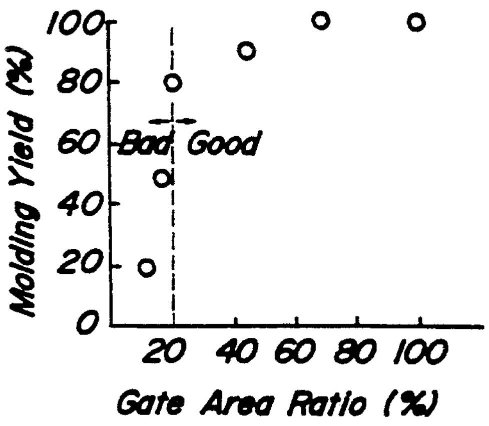
FIGS. 20–22 are graphs showing the relation between percent gate area and molding yield, respectively.
Figure 21:
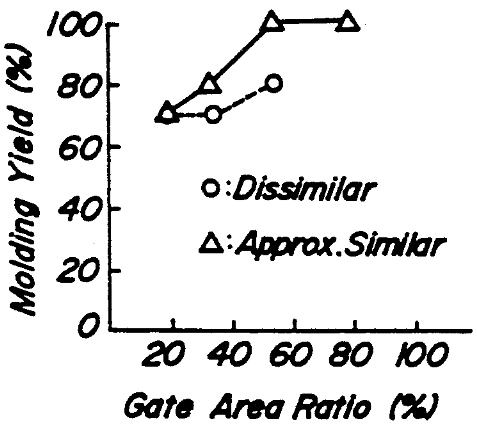
Figure 22:
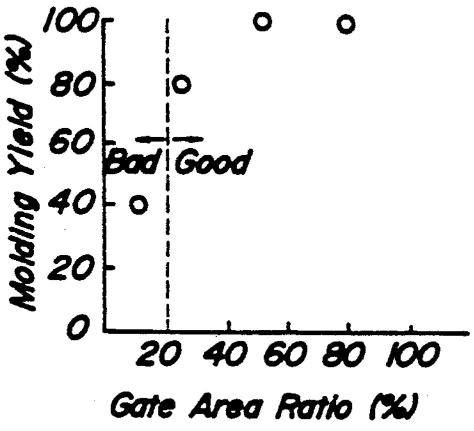

The steps of compounding the starting material, mixing, pulverizing and spray-drying were conducted in the same manner as Example 1 to provide particulates having an average particle diameter of 30 μm. Then, 100 parts by weight of the resulting particulates were admixed and kneaded with 1 part by weight of a surfactant (Sedran FF-200, the trade name, manufactured by Sanyo Chemical Industries, Ltd.), 7 parts by weight of a plasticizer (methyl cellulose) and 30 parts by weight of water. Then, the obtained kneaded body was subjected to deairing pugging at a degree of vacuum of 70 cmHg, and a pug of 52 mm diameter, 500 mm long was obtained. The pug was hydrostaticly pressed at a pressure of 2.5 tons/cm$^2$. The resultant was injection molded by using an injection mold having a shape as shown in Table 3, under conditions of: a material temperature of 12° C., a metal mold temperature of 60° C., an injection pressure of 300 kg/cm$^2$ and an injection speed of 200 cc/sec. Thus, molded bodies $M_6$, $M_7$ and $M_8$ as shown in FIGS. 13-15, respectively, were obtained. The results are shown in Table 3 and FIGS. 20-22.

TABLE 3

| Test No. | Molded Body | Shape of gate | Area Ratio of Gate to Maximum Cross-section of Cavity (%) | Molding Result |
|---|---|---|---|---|
| 1 | $M_6$ | Circular (Similar Figure) | 11 | 2/10 |
| 2 | $M_6$ | Circular (Similar Figure) | 16 | 5/10 |
| 3 | $M_6$ | Circular (Similar Figure) | 20 | 8/10 |
| 4 | $M_6$ | Circular (Similar Figure) | 44 | 9/10 |
| 5 | $M_6$ | Circular (Similar Figure) | 69 | 10/10 |
| 6 | $M_6$ | Circular (Similar Figure) | 100 | 10/10 |
| 7 | $M_7$ | Circular (Dissimilar Figure) | 20 | 7/10 |
| 8 | $M_7$ | Circular (Dissimilar Figure) | 35 | 7/10 |
| 9 | $M_7$ | Circular (Dissimilar Figure) | 55 | 8/10 |
| 10 | $M_7$ | Oval (Approx. Similar Figure) | 20 | 7/10 |
| 11 | $M_7$ | Oval (Approx. Similar Figure) | 35 | 8/10 |

TABLE 3-continued

| Test No. | Molded Body | Shape of gate | Area Ratio of Gate to Maximum Cross-section of Cavity (%) | Molding Result |
|---|---|---|---|---|
| 12 | $M_7$ | Oval (Approx. Similar Figure) | 55 | 10/10 |
| 13 | $M_7$ | Oval (Approx. Similar Figure) | 80 | 10/10 |
| 14 | $M_8$ | Circular (Approx. Similar Figure) | 11 | 4/10 |
| 15 | $M_8$ | Circular (Approx. Similar Figure) | 25 | 8/10 |
| 16 | $M_8$ | Circular (Approx. Similar Figure) | 51 | 10/10 |
| 17 | $M_8$ | Circular (Approx. Similar Figure) | 80 | 10/10 |

Note: The result of molding shows a ratio of conforming articles per 10 molded articles.

As apparent from the above results, if a mold having a gate area of at least 20% of the maximum cross-sectional area of the cavity viewed from the gate side is used, molded bodies free from defects such as pores, weld-marks or the like can be produced, and the molding yield is largely improved. Further, the larger the ratio of the gate opening area to the projection of cavity, the more the mold having a figure similar or approximately similar to the projection of the cavity improves the molding yield.

EXAMPLE 3

Figure 23:
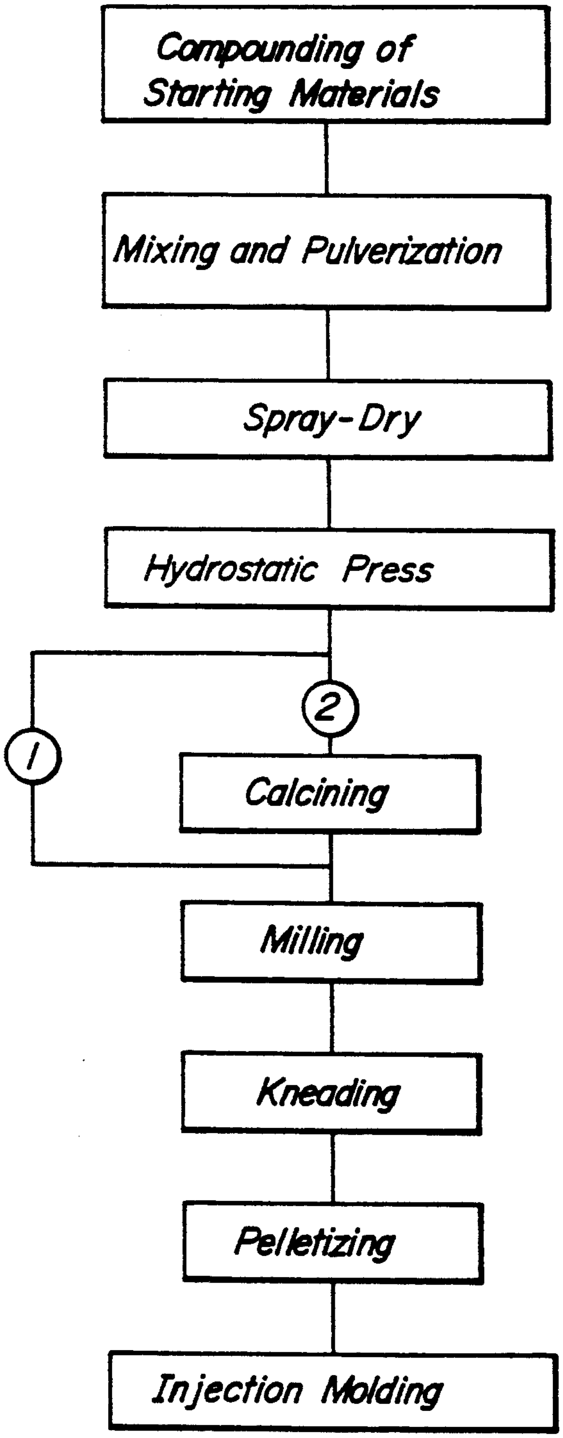
FIG. 23 is a different process flow sheet showing steps from preparation of starting material through injection molding of an injection molding material of organic system.

An injection molding process wherein an organic molding material was used will be explained according to the process flow chart shown in FIG. 23.

After mixing 100 parts by weight of a ceramic starting material ($Si_3N_4$) powder with 2 parts by weight of SrO powder, 3 parts by weight of MgO powder and 3 parts by weight of $CeO_2$ powder as sintering aids, this mixture was pulverized into an average particle diameter of 0.5 μm. Then, the resultant was spray-dried to provide particulates having an average particle diameter of 30 μm. The particulates were pressed hydrostaticly at a pressure of 3 tons/cm$^2$.

Then, the pressed material was subjected to two separate steps: (1) the step of milling again into an average particle diameter of 30 μm (hereinafter referred to as Step (1), and (2) the step of calcining at 450° C. for 5 hours in atmosphere, followed by milling into an average particle diameter of 30 μm (hereinafter referred to as Step (2)). After milling, 100 parts by weight of the obtained powder were admixed with 3 parts by weight of a binder, 15 parts by weight of a plasticizer and 2 parts by weight of a lubricant and kneaded with a kneader to provide an organic molding material. The obtained molding material was pelletized by an extruder. The resulting pellets were injected and packed by an injection molding machine into metal molds as shown in FIG. 9a and FIGS. 10a and 10b, respectively. The packing process for the molded bodies $M_9$ was conducted by using metal molds as shown in FIGS. 9b (Process 1) and 9c (Process 2), respectively. The taper angle of the sprue was 2° and 5° in Processes 1 and 2, respectively. Further, the packing process for producing the molded bodies $M_{10}$ was conducted by using metal molds as shown in FIGS. 10c (Process 3), 10d (Process 4) and 10e (Process 5), respectively. The taper angle of the sprue was 10° and 5° in Processes 4 and 5, respectively. In Process 5, the runners R and R' were the same in length and diameter, having the same taper angle of 5°. Process 6 was conducted in the same manner as Process 5, except that the runner R had a smaller diameter than the runner R', the taper angles of the runners R and R' were 5° and 10°, respectively, and the flow rate of the molding material was controlled. The respective schematic views of filling-up processes are shown in FIG. 24 and the molding results are shown in Table 4.

Figure 24:
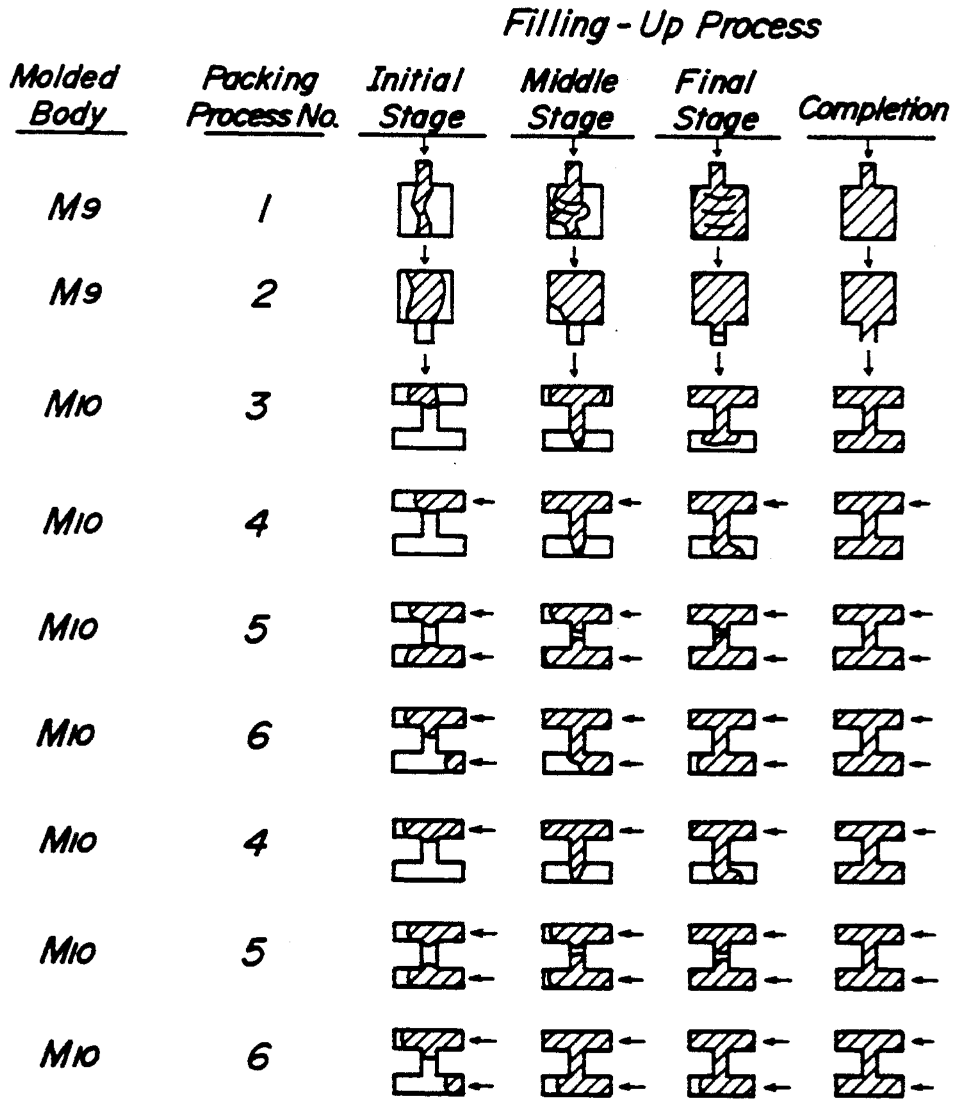
FIG. 24 shows schematic views of injection and filling up processes of a molding material of organic system.

As is seen from the schematic views of the filling-up processes shown in FIG. 24, Process 1 wherein the molding material was filled up through the narrow portion of the cavity corresponding to the thin portion of the molded body $M_9$ was not preferred because jetting of the molding material took place at the broad portion. In contrast, Process 2 wherein the molding material was filled up through the broad portion of the cavity corresponding to the thick portion of the molded body $M_9$ and flowed along the shape of the cavity was preferred because no jetting took place and uniform filling-up was attained and, moreover, molding yield was improved as shown in Table 4.

Alternatively, with the metal mold for the molded body $M_{10}$ having a cavity comprising a plurality of broad portions 5' and 5'', Processes 3 and 5 wherein filling-up was conducted from one of the broad portions were found to be not preferable because the other broad portion was filled up through a narrow portion, causing the same problem as the above Process 1. In contrast, Processes 5 and 6 wherein filling-up was conducted from both the broad portions 5' and 5'' were preferred because the molding material was filled up uniformly and the molding yield was improved as shown in Table 4. Further, better results were obtained with Process 6, as compared with Process 5, because of less defects, as the molding materials were controlled to join and weld together at the broad portion.

TABLE 4

| | | | | | Result of Molding | |
|---|---|---|---|---|---|---|
| Step | Calcination | Molded Body | Packing Process | Filling-up Process (Figure) | Conforming Article/ Molded Article | Main Defect of Offgrade Articles |
| ① | No | $M_9$ | 1 | FIG. 24 | 1/5 | Pores, Weld-marks |
| | | | 2 | FIG. 24 | 5/5 | Nil |
| ① | No | $M_{10}$ | 3 | FIG. 24 | 1/5 | Weld-marks |
| | | | 4 | FIG. 24 | 0/5 | Weld-marks |
| | | | 5 | FIG. 24 | 4/5 | Weld-marks |
| | | | 6 | FIG. 24 | 5/5 | Nil |
| ② | Done | $M_{10}$ | 4 | FIG. 24 | 2/5 | Weld-marks |
| | | | 5 | FIG. 24 | 5/5 | Nil |
| | | | 6 | FIG. 24 | 5/5 | Nil |

EXAMPLE 4

An injection molding process wherein a molding material of aqueous system was used will be explained according to the process flow chart shown in FIG. 25.

The steps of compounding the starting materials, mixing, pulverizing and spray-drying were conducted in the same manner as Example 3 to provide particulates having an average particle diameter of 30 μm. Then, 100 parts by weight of the resulting particulates were admixed and kneaded with 30 parts by weight of water, 7 parts by weight of a binder and 1 part by weight of a surfactant to provide a molding material of aqueous system. The obtained aqueous system molding material was extruded from a vacuum extruder to form a columnar shaped molding material of 52 mm diameter, 340 mm long, which was then hydrostaticly pressed with a rubber press at a pressure of 2.5 tons/cm$^2$. The obtained aqueous system molding material was injection molded by using an injection molding machine in the same manner as Example 3 and molded bodies $M_{11}$ and $M_{12}$ were produced.

Figure 26:
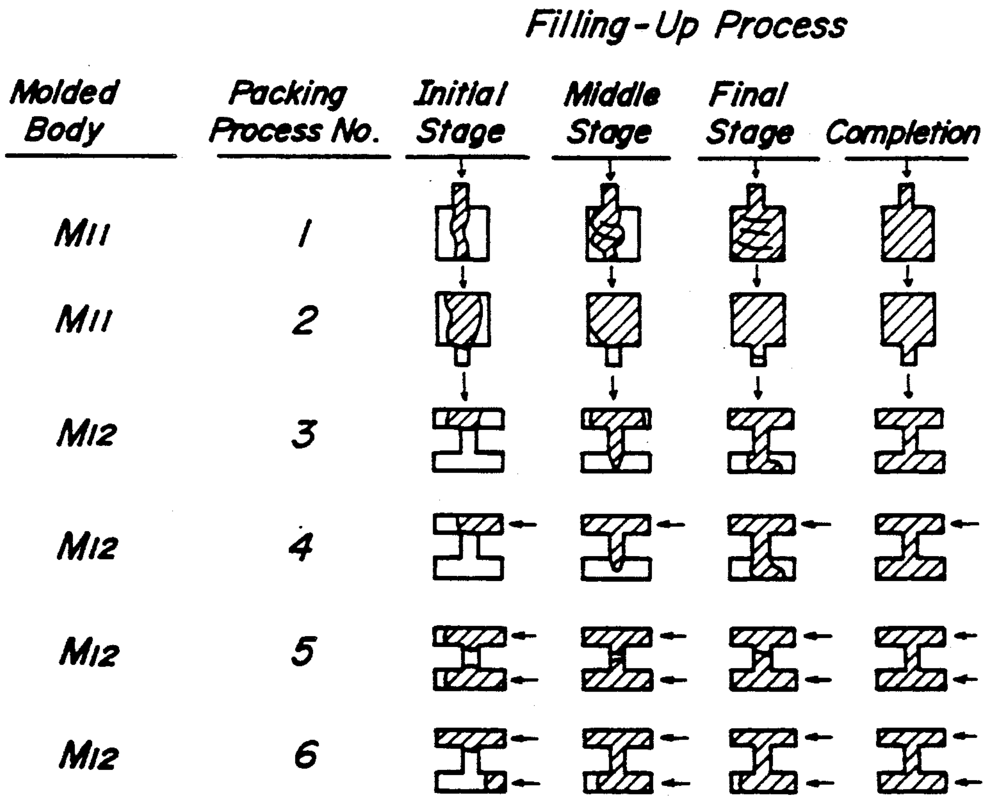
FIG. 26 shows schematic views of injection and filling up processes of a molding material of aqueous system.

The respective schematic views of filling-up process are shown in FIG. 26 and the molding results are shown in Table 5. It has been found that substantially the same results as in the case of the organic system molding material in Example 3 can be obtained.

TABLE 5

Figure 25:
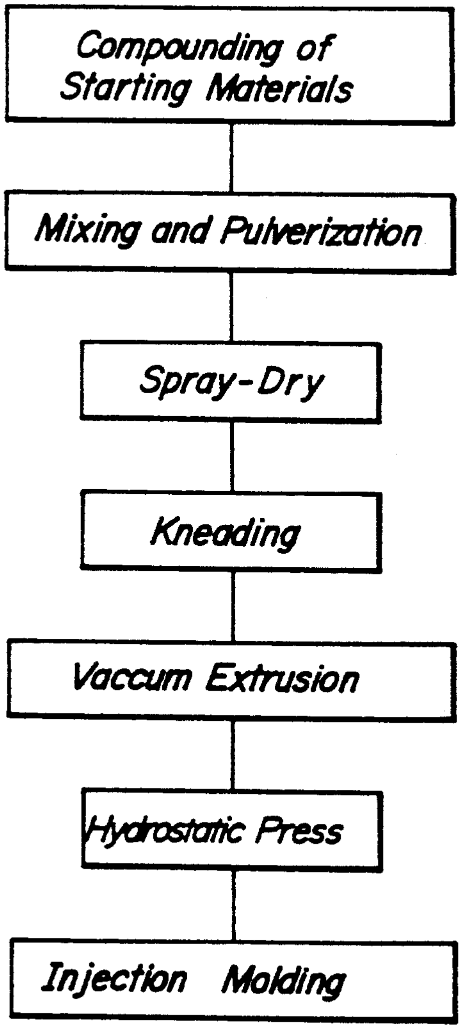
FIG. 25 is a different process flow sheet showing steps from preparation of starting material through injection molding of an injection molding material of aqueous system.

| | | | Result of Molding | |
|---|---|---|---|---|
| Molded Body | Packing Process | Filling-up Process (Figure) | Conforming Article/ Molded Article | Main Defect of Offgrade Articles |
| $M_{11}$ | 1 | FIG. 25 | 0/5 | Pores, Weld-marks |
| | 2 | FIG. 25 | 5/5 | Nil |
| $M_{12}$ | 3 | FIG. 25 | 0/5 | Weld-marks |
| | 4 | FIG. 25 | 0/5 | Weld-marks |
| | 5 | FIG. 25 | 3/5 | Weld-marks, Pores |
| | 6 | FIG. 25 | 5/5 | Nil |

EXAMPLE 5

Figure 27:
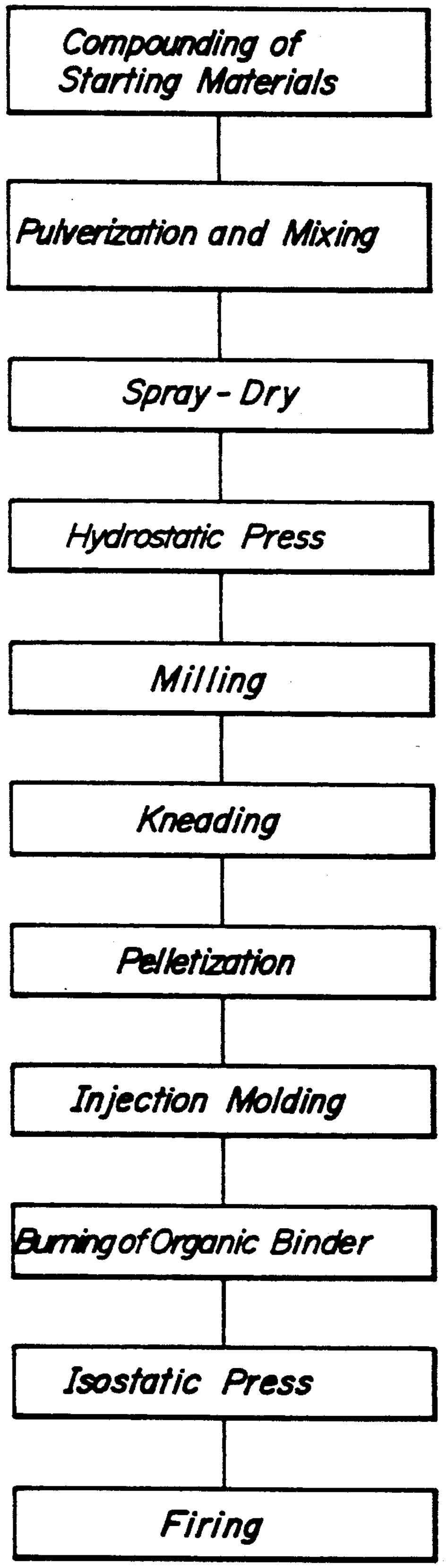
FIG. 27 is a further different process flow sheet showing steps from preparation of starting material through injection molding of an injection molding material of organic system.

An injection molding process using an organic binder was conducted. The injection molding process will be explained hereinafter according to the process flow chart shown in FIG. 27.

Figure 28:
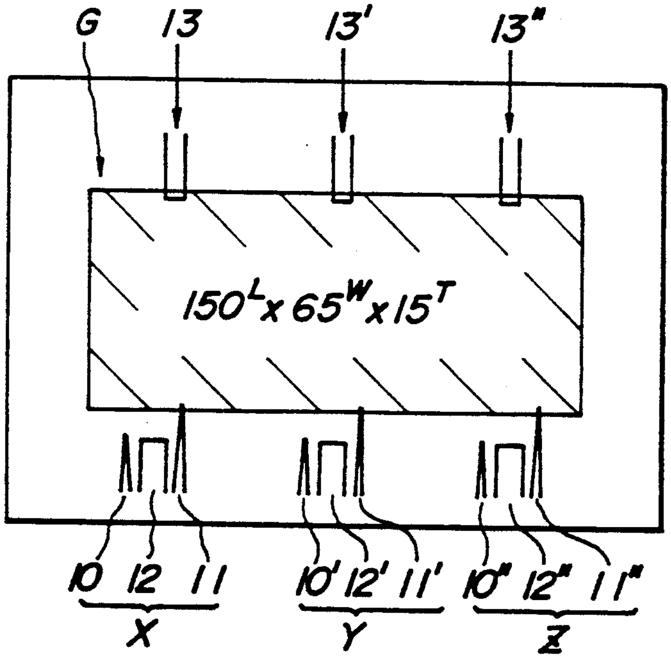
FIGS. 28, 29 and 30a are illustrative views showing examples of the metal mold to be used in the present invention, respectively.

After admixing 100 parts by weight of silicon nitride powder as a ceramic starting material with 2 parts by weight of SrO, 3 parts by weight of MgO and 3 parts by weight of $CeO_2$, the resulting mixture was pulverized and mixed to prepare a compound power having an average particle diameter of 0.5 μm. Then, the resultant was spray-dried to provide particulates having an average particle diameter of 30 μm which were pressed hydrostaticly at a pressure of 2.5 tons/cm$^2$ and granulated. Then, the granulated material was milled into an average particle diameter of 30 μm. Then, 100 parts by weight of the obtained powder were admixed and kneaded with 3 parts by weight of a binder, 15 parts by weight of wax and 2 parts by weight of a lubricant. The mixture was pelletized and then injected at a material temperature of 68° C., an injection pressure of 400 kg/cm$^2$, an injection speed of 100-300 cc/sec. and a pressing time of 15 sec., into a metal mold as shown in FIG. 28 with a gate having a shape approximately similar to the shape of the cavity and the maximum cross-sectional area of at least 20% of the cavity viewed from the gate side. During injection molding, the temperature of this metal mold was controlled at points, X, Y and Z, respectively, at temperatures as shown in Table 6. Thus, a molded body 150 mm long, 65 mm wide and 15 mm thick was obtained. The temperatures of the molded body during molding are shown in Table 6.

The metal mold shown in FIG. 28 was provided with thermocouples 10, 10' and 10'' for measuring the temperatures of the metal mold, thermocouples 11, 11' and 11'' for measuring the temperatures of the mold body and heaters 12, 12' and 12'' for heating the metal mold, to control the metal mold temperatures and molded body temperatures. Additionally, the character G indicates the gate (entrance) of the metal mold and the numerals 13, 13' and 13'' indicate sensors for detecting an internal pressure of the mold, respectively. The sampling interval of temperature and pressure of the sensor was 10 μsec.

Then, the molded body was heated at a temperature increase rate of 1°-3° C./hour up to 400° C. which temperature was kept for 5 hours to burn the organic binder of the molded body. The burned body was pressed hydrostaticly at a pressure of 7 tons/cm$^2$ followed by firing at 1,700° C. and under normal pressure in a nitrogen atmosphere to provide a cubiform sintered product. The dimensional accuracy and strength of the obtained sintered product are shown in Table 6.

COMPARATIVE EXAMPLES 1 and 2

A molded body was manufactured and a cubiform sintered product was obtained therefrom in the same manner as Example 5 except that the temperature of the metal mold was controlled under the conditions shown in Table 6. The dimensional accuracy and strength of the obtained sintered product are shown in Table 6.

EXAMPLE 6

Figure 29:
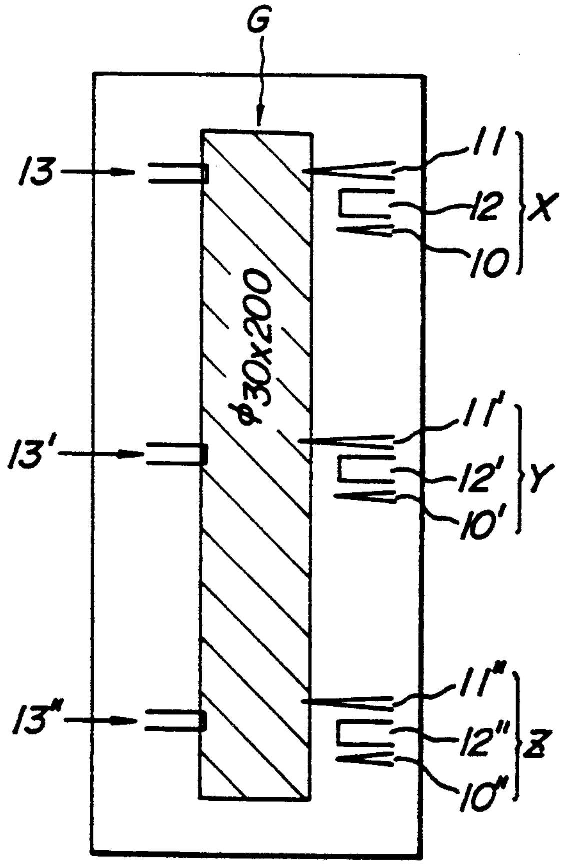

Using the same starting material as that used in Example 5 and a metal mold as shown in FIG. 29 with a gate having a shape approximately similar to the shape of the cavity and the maximum cross-sectional area of at least 20% of the cavity viewed from the gate side, a molded body of 30 mm diameter, 200 mm long was obtained in the same manner as Example 5 except that the temperature of the metal mold was controlled under conditions as shown in Table 6. Further, the molded body was burned and fired in the same manner as Example 5 and a circular cylindrical sintered product was obtained. The dimensional accuracy and strength of the obtained sintered product are shown in Table 6.

COMPARATIVE EXAMPLE 3

A columnar sintered product was obtained in the same manner as Example 6 except that the temperature of the metal mold was controlled as shown in Table 6. The dimensional accuracy and strength of the obtained sintered product are shown in Table 6.

EXAMPLE 7

Figure 30A:
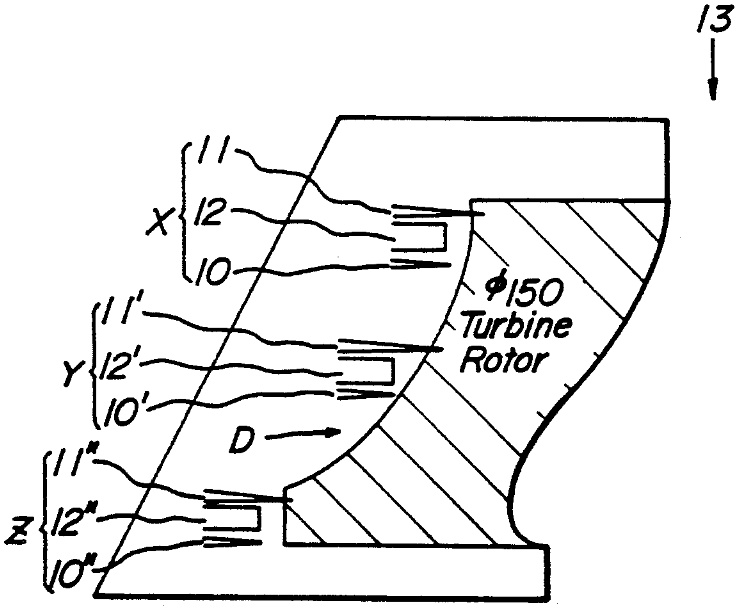
Figure 30B:
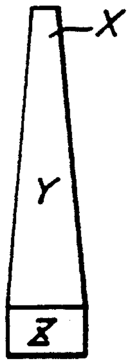
FIG. 30b is a side elevation of the metal mold shown in FIG. 30a, from the D-direction.

Using the same starting materials as Example 5 and a metal mold as shown in FIGS. 30*a* and 30*b* provided with a cavity comprising a plurality of broad portions and a gate having a shape approximately similar to the projection of the cavity and the maximum cross-sectional area of at least 20% of the cavity viewed from the gate side, a molded body for turbine rotor having a blade span of 150 mm and a blade height of 100 mm was obtained by injection molding in the same manner as Example 5 except that the temperature of the metal mold was controlled under conditions as shown in Table 6. Further, the obtained molded body was burned and fired in the same manner as Example 5 and a sintered product for turbine rotor was produced. The dimensional accuracy of the resulting sintered product is shown in Table 6.

COMPARATIVE EXAMPLE 4

A sintered product for turbine rotor was produced in the same manner as Example 7 except that the temperature of the metal mold was controlled under conditions as shown in Table 6. The dimensional accuracy of the obtained sintered product is shown in Table 6.

As apparent from the above Examples 5-7 and Comparative Examples 1-4, when the temperature of the metal mold is controlled in such a manner that it is elevated gradually from the gate portion towards the endmost portion and the temperature elevation is brought within a range of temperature gradient as shown in FIG. 11, the distribution of temperature of the molded article is within ±0.5° C. about the setting temperature at the time the pressurization has just been completed, yielding a sintered product with high dimensional accuracy and strength.

TABLE 6

| Dimension of Molded Body | $150^L \times 65^W \times 15^T$ | | | | | | | | |
|---|---|---|---|---|---|---|---|---|---|
| Example No. | Example 5 | | | Comparative Example 1 | | | Comparative Example 2 | | |
| Measuring Point | X | Y | Z | X | Y | Z | X | Y | Z |
| Controlled Temperature of Mold (°C.) | 47 | 48 | 49 | 46.0 | 46.0 | 46.0 | 48 | 50 | 53 |
| Travel Time of Molding Material (sec) | 0.05 | 0.37 | 0.68 | 0.05 | 0.37 | 0.68 | 0.05 | 0.37 | 0.68 |
| Temperature of Molded Body upon Completion of Pressing (°C.) | 51.7 | 51.5 | 51.3 | 51.3 | 50.1 | 48.6 | 52.1 | 52.2 | 52.7 |
| Pressure of Molded body (Kg/cm$^2$) | 310 | 305 | 295 | 310 | 280 | 240 | 335 | 331 | 328 |
| Surface Condition of Sintered Product (Zyglo Flaw Detect Test) | No Exudation | No Exudation | No Exudation | No Exudation | Some Exudation | Much Exudation | Unmeasurable, Unreleasable from Mold due to insufficient solidification upon cooling in molding. | | |
| Dimension of Sintered Product (mm) | 52.4 | 52.5 | 52.4 | 52.4 | 52.2 | 51.9 | | | |
| Strength of Sintered Product (kg/mm$^2$) | 93 | 92 | 90 | 90 | 86 | 81 | | | |

| Dimension of Molded Body | $\phi 30 \times 200^L$ | | | | | | $\phi 150 \times 100^L$ Turbine Rotor | | | | | |
|---|---|---|---|---|---|---|---|---|---|---|---|---|
| Example No. | Example 6 | | | Comparative Example 3 | | | Example 7 | | | Comparative Example 4 | | |
| Measuring Point | X | Y | Z | X | Y | Z | X | Y | Z | X | Y | Z |

TABLE 6-continued

| | | | | | | | | | | | | |
|---|---|---|---|---|---|---|---|---|---|---|---|---|
| Controlled Temperature of Mold (°C.) | 46.5 | 47.5 | 48.5 | 46.0 | 46.0 | 46.0 | 51.2 | 50.5 | 49.5 | 48.0 | 48.0 | 48.0 |
| Travel Time of Molding Material (sec) | 0.04 | 0.35 | 0.67 | 0.04 | 0.35 | 0.67 | 1.3 | 1.5 | 1.7 | 1.3 | 1.5 | 1.7 |
| Temperature of Molded Body upon Completion of Pressing (°C.) | 51.9 | 51.6 | 51.4 | 51.4 | 50.5 | 49.5 | 52.1 | 51.9 | 51.8 | 48.5 | 49.3 | 50.6 |
| Pressure of Molded body ($Kg/cm^2$) | 365 | 357 | 349 | 350 | 335 | 290 | — | — | — | — | — | — |
| Surface Condition of Sintered Product (Zyglo Flaw Detect Test) | No Exudation | No Exudation | No Exudation | No Exudation | Some Exudation | Much Exudation | No Exudation | No Exudation | No Exudation | Much Exudation | Some Exudation | No Exudation |
| Dimension of Sintered Product (mm) | 16.13 | 16.13 | 16.11 | 16.13 | 16.10 | 16.05 | Shape accorded with Spec. of Mold | | | Portion from X to Y disaccorded with Spec. of Mold | | |
| Strength of Sintered Product ($kg/mm^2$) | 95 | 94 | 92 | 93 | 90 | 85 | — | — | — | — | — | — |

EXAMPLE 8

Figure 31:
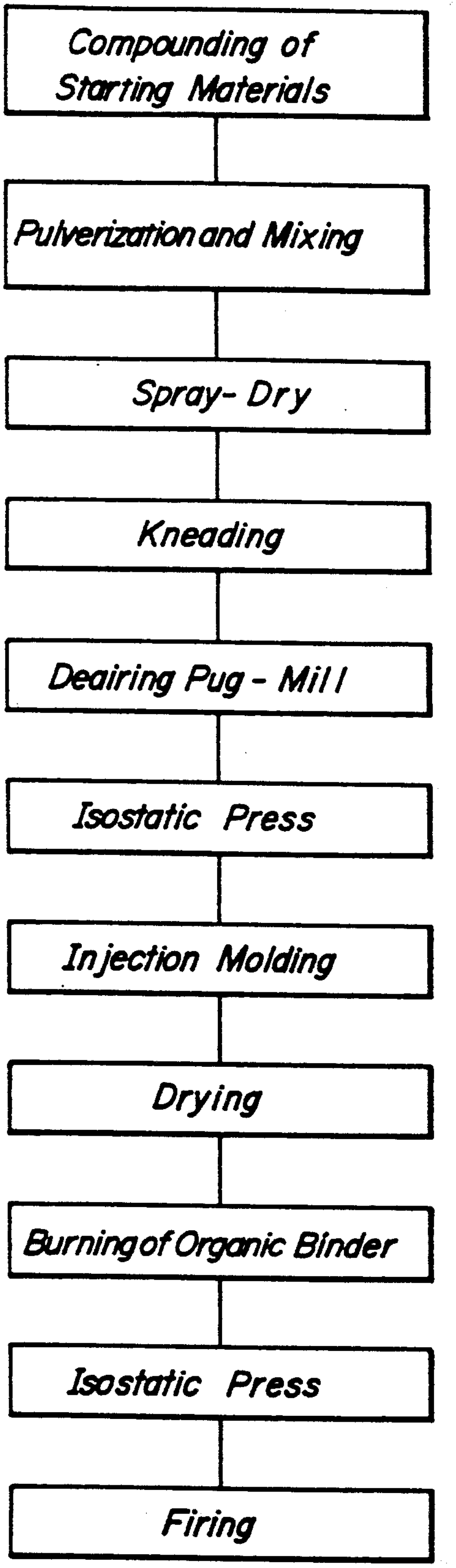
FIG. 31 is a further different process flow sheet showing steps from preparation of starting material through firing of injection molded bodies, of an injection molding material of aqueous system.

An injection molding process using a pug was conducted. The injection molding process will be explained hereinafter according to the process flow chart shown in FIG. 31.

After admixing 100 parts by weight of silicon nitride powder as a ceramic starting material with 2 parts by weight of SrO and 3 parts by weight of $CeO_2$, the resulting mixture was pulverized and mixed to prepare a compound powder having an average particle diameter of 0.6 μm. Then, the resultant was spray-dried to provide particulates having an average particle diameter of about 30 μm. After admixing and kneading 100 parts by weight of the resulting dried particulates with 8 parts by weight of an organic binder comprising 7 parts by weight of methyl cellulose and 1 part by weight of Sedran FF-200 and about 30 parts by weight of water, the mixture was then subjected to an deairing pug-milling at a degree of vacuum of 70 cmHg and a pug of 52 mm diameter, 500 mm long was obtained. The obtained pug was pressed hydrostaticly at a pressure of 2.5 $tons/cm^2$ and then laid at a temperature of 12° C. overnight in a cool and dark room, which was then injected into a mold having the same shape as that used in Example 5 as shown in FIG. 28 at a pug temperature of 12° C., an injection pressure of 150–300 $g/cm^2$, an injection speed of 100–300 cc/sec. and a gel-hardening time of 1–3 min., with the mold temperatures at points X, Y and Z being controlled, respectively, as shown in Table 7. thus, a molded body 150 mm long, 65 mm wide and 15 mm thick was obtained. The temperatures of the molded body during molding are shown in Table 7.

Then, the molded body was dried by raising the temperature from 60° C. up to 100° C. and lowering the humidity from 98% to 20% in a thermo-hygrostat. The dried body was then heated at a temperature increasing rate of 50° C./hour up to 500° C. which temperature was kept for 5 hours to burn the binder. The burned body was pressed hydrostaticly at a pressure of 7 $tons/cm^2$ and then heated at a temperature increasing rate of 700° C./hour up to 1,650° C. at which temperature firing was conducted for 1 hour and a cubiform sintered product was obtained. The dimensional accuracy and strength of the obtained sintered product are shown in Table 7.

COMPARATIVE EXAMPLES 5 and 6

A cubiform sintered body was manufactured in the same manner as Example 8 except that the temperature of the metal mold was controlled under the conditions shown in Table 7. The dimensional accuracy and strength of the obtained sintered product are shown in Table 7.

EXAMPLE 9

Using the same starting material as that used in Example 8, injection molding was conducted in the same manner as Example 8 except that the metal mold shown in FIG. 29 was used and its temperature was controlled under conditions as shown in Table 7, and a molded body of 30 mm diameter, 200 mm long was obtained. Further, binder burning and firing were conducted in the same manner as Example 8 and a columnar sintered product was obtained. The dimensional accuracy and strength of the obtained sintered product are shown in Table 7.

COMPARATIVE EXAMPLE 7

A columnar sintered product was obtained in the same manner as Example 9 except that the temperature of the metal mold was controlled under the conditions shown in Table 7. The dimensional accuracy and strength of the obtained sintered product are shown in Table 7.

EXAMPLE 10

Using the same starting material as that used in Example 8, injection molding was conducted in the same manner as Example 8 except that the metal mold shown in FIGS. 30*a* and 30*b* was used and its temperature was controlled under conditions as shown in Table 7, and a molded body for turbine rotor having a blade span of 150 mm and a blade height of 100 mm was obtained. Further, binder burning and firing were conducted in the same manner as Example 8 and a sintered product for turbine rotor was produced. The dimensional accuracy of the resulting sintered product is shown in Table 7.

COMPARATIVE EXAMPLE 8

A sintered product for turbine rotor was obtained in the same manner as Example 10 except that the temperature of the metal mold was controlled under the conditions shown in Table 7. The dimensional accuracy of the obtained sintered product was shown in Table 7.

It is seen from the above Examples 8–10 and Comparative Examples 5–8 that when the temperature of the metal mold is controlled in such a manner that it descends gradually from the gate portion towards the endmost portion and the temperature descent is brought within the range of temperature gradient shown in FIG.

11, the distribution of temperature of the molded article is within ±0.5° C. about a setting temperature at the time the pressurization has just been completed, yielding a sintered product with high dimensional accuracy and strength.

cavity corresponding to the thick portion of the molded body.

Furthermore, according to the present invention wherein the temperature of the above-mentioned metal molds is controlled in such a manner that the tempera-

TABLE 7

| Dimension of Molded Body | $150^L \times 65^W \times 15^T$ | | | | | | | | |
|---|---|---|---|---|---|---|---|---|---|
| Example No. | Example 8 | | | Comparative Example 5 | | | Comparative Example 6 | | |
| Measuring Point | X | Y | Z | X | Y | Z | X | Y | Z |
| Controlled Temperature of Mold (°C.) | 54 | 53 | 52 | 55 | 55 | 55 | 50 | 49 | 47 |
| Travel Time of Molding Material (sec) | 0.05 | 0.37 | 0.68 | 0.05 | 0.37 | 0.68 | 0.05 | 0.37 | 0.68 |
| Temperature of Molded Body upon Completion of Pressing (°C.) | 48.5 | 48.7 | 49.1 | 49.6 | 50.9 | 52.3 | 44.3 | 44.9 | 45.3 |
| Pressure of Molded Body ($Kg/cm^2$) | 280 | 270 | 265 | 280 | 245 | 200 | 305 | 300 | 296 |
| Surface Condition of Sintered Product (Zyglo Flaw Detect Test) | No Exudation | No Exudation | No Exudation | No Exudation | Some Exudation | Much Exudation | Unmeasurable, deformed due to insufficient gel-hardening during molding | | |
| Dimension of Sintered Product (mm) | 50.0 | 50.1 | 50.0 | 50.0 | 49.4 | 49.1 | | | |
| Strength of Sintered Product ($kg/mm^2$) | 94 | 93 | 91 | 92 | 88 | 83 | | | |

| Dimension of Molded Body | $\phi 30 \times 200^L$ | | | | | | $\phi 150 \times 100^L$ Turbine Rotor | | | | | |
|---|---|---|---|---|---|---|---|---|---|---|---|---|
| Example No. | Example 9 | | | Comparative Example 7 | | | Example 10 | | | Comparative Example 8 | | |
| Measuring Point | X | Y | Z | X | Y | Z | X | Y | Z | X | Y | Z |
| Controlled Temperature of Mold (°C.) | 54.5 | 53.5 | 52.5 | 55 | 55 | 55 | 50.5 | 52.0 | 53.5 | 55 | 55 | 55 |
| Travel Time of Molding Material (sec) | 0.04 | 0.35 | 0.67 | 0.04 | 0.35 | 0.67 | 1.3 | 1.5 | 1.7 | 1.3 | 1.5 | 1.7 |
| Temperature of Molded Body upon Completion of Pressing (°C.) | 48.8 | 49.1 | 49.4 | 49.3 | 50.4 | 51.9 | 49.2 | 49.0 | 48.7 | 52.9 | 51.4 | 50.3 |
| Pressure of Molded Body ($Kg/cm^2$) | 335 | 327 | 314 | 320 | 305 | 260 | — | — | — | — | — | — |
| Surface Condition of Sintered Product (Zyglo Flaw Detect Test) | No Exudation | No Exudation | No Exudation | No Exudation | Some Exudation | Much Exudation | No Exudation | No Exudation | No Exudation | Much Exudation | Some Exudation | No Exudation |
| Dimension of Sintered Product (mm) | 15.38 | 15.38 | 15.36 | 15.38 | 15.35 | 15.30 | Shape accorded with Spec. of Mold | | | Portion from X to Y disaccorded with Spec. of Mold | | |
| Strength of Sintered Product ($kg/mm^2$) | 96 | 94 | 93 | 94 | 91 | 87 | — | — | — | — | — | — |

As explained and demonstrated above, the present invention exhibits effects as follows:

When injection molding is conducted according to the injection molding method of the first embodiment of the present invention using an injection mold having a gate area of at least 20% of the maximum cross-sectional area of the cavity viewed from the gate side, flawless and homogeneous sintered products can be obtained.

Additionally, when the cross-sectional shape of the gate opening is made to be similar or approximately similar to the projection of the cavity (molded body) viewed from the gate side, formation of defects of the molded bodies can be prevented more effectively.

Alternatively, in the case where molded bodies comprising a plurality of portions different in thickness is manufactured by injections molding, molded bodies free from defects, such as weld-mark, pores or the like, can be produced in a high yield by arranging the injection gate in the position to open directly into the broad portion of the cavity corresponding to the thick portion of the molded body. Further, when the mold comprises a plurality of thick portions, flawless molded bodies can be obtained as well by providing an injection gate to open directly into at least one broad portion of the ture distribution of the molded body is controlled within a narrow range, i.e., ±0.5° C. about a setting temperature, molded bodies uniform throughout the whole body can be obtained, yielding homogeneous ceramic sintered products with high dimensional accuracy and strength.

The present invention can be applied to either molding materials of organic or aqueous systems and is very useful in industry.

What is claimed is:

1. An injection molding process for forming flawless ceramic molded bodies, comprising injecting a molding material comprising a ceramic powder and an organic binder into a cavity of a mold of an injection molding machine through a gate having an area of at least 20% a maximum cross-sectional area of said cavity viewed from the gate side thereof such that the molding material flows along the shape of the mold cavity and air is purged smoothly and uniformly from the cavity.

2. The process according to claim 1, wherein the gate has an area of at least 30% of the maximum cross-sectional area of the cavity.

3. The process according to claim 1, wherein the gate has an area of at least 40% of the maximum cross-sectional area of the cavity.

4. The process according to claim 1, wherein the gate has an area of at least 50% of the maximum cross-sectional area of the cavity.

5. The process according to claim 1, wherein the gate has a shape substantially similar to a projection of the cavity viewed from the gate side thereof, whereby the molding material having passed through the gate is controlled to flow along the shape of the cavity.

6. The process according to claim 1, further comprising controlling the temperature of the mold to have a temperature gradient where a distribution of temperature of the molded body in a vicinity of the mold is brought into the range of ±0.5° C. about a setting temperature, at a time pressurization of the molded body in the mold has just been completed.

7. The process according to claim 6, wherein the temperature gradient of the mold is set to satisfy the following inequality:

$$x \leqq y \leqq 5x$$

wherein x is a travel time in second of molding material from the gate to a temperature measuring position and y is a temperature difference °C. of the mold between the gate and the temperature measuring position.

8. An injection molding process for forming a flawless ceramic molded body comprising a plurality of portions different in thickness, said method comprising injecting a molding material comprising a ceramic powder and an organic binder into a cavity of a mold of an injection molding machine through a gate which opens directly into a broad portion of said cavity corresponding to a thick portion of the molded body such that the molding material flows along the shape of the mold cavity and air is purged smoothly and uniformly from the cavity.

9. The process according to claim 8, wherein the molded body comprises a plurality of thick portions and the injection of the molding material into the cavity is conducted through a plurality of gates each opening directly into a broad portion of the cavity corresponding to a thick portion of the molded body, whereby the injected molding materials join and weld together in a narrow portion of the cavity.

10. The process according to claim 8, further comprising controlling the temperature mold to have a temperature gradient where the distribution of temperature of the molded body in a vicinity of the mold is brought into the range of ±0.5° C. about a setting temperature, at the time pressurization of the molded body in the mold has just been completed 11. The process according to claim 10, wherein the temperature gradient of the mold is set to satisfy the following inequality:

$$x \leqq y \leqq 5x$$

wherein x is a travel time in seconds of molding material from the gate to a temperature measuring position and y is a temperature difference °C. of the mold between the gate and the temperature measuring position.

* * * * *

UNITED STATES PATENT AND TRADEMARK OFFICE
CERTIFICATE OF CORRECTION

PATENT NO. : 5,066,449

DATED : November 19, 1991

INVENTOR(S) : Shigeki KATO et al.

It is certified that error appears in the above-identified patent and that said Letters Patent is hereby corrected as shown below:

Title page:

Section [56], References Cited, after the "U.S. PATENT DOCUMENTS" section insert the following:

--FOREIGN PATENT DOCUMENTS 2750585 5/1978 Fed. Rep. of Germany--;

after "OTHER PUBLICATIONS" insert --"Keramische Zeitschrift", 1988, No. 11, page 862--, and change "Matsuddy" to --Mutsuddy--.

Signed and Sealed this

Thirteenth Day of April, 1993

*Attest:*

STEPHEN G. KUNIN

*Attesting Officer*

*Acting Commissioner of Patents and Trademarks*